FIG·1

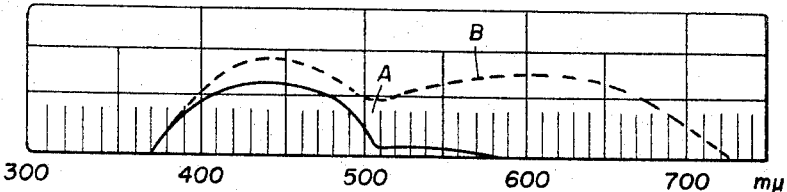

A = DYE X = 4-p-DIBUTYLAMINOSTYRYL-1-METHYLQUINOLINIUM IODIDE
B = DYE X + CALCOFLUOR WHITE MR

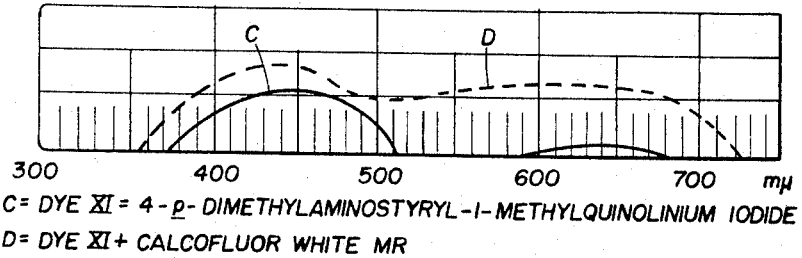

FIG·2

C = DYE XI = 4-p-DIMETHYLAMINOSTYRYL-1-METHYLQUINOLINIUM IODIDE
D = DYE XI + CALCOFLUOR WHITE MR

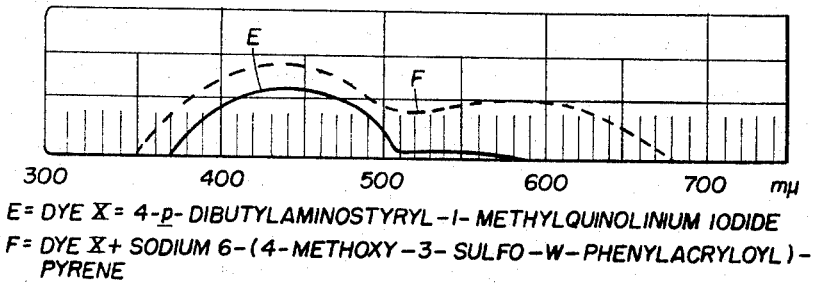

FIG·3

E = DYE X = 4-p-DIBUTYLAMINOSTYRYL-1-METHYLQUINOLINIUM IODIDE
F = DYE X + SODIUM 6-(4-METHOXY-3-SULFO-W-PHENYLACRYLOYL)-PYRENE

NORMAN W. KALENDA
INVENTOR.

BY R. Frank Smith
Ray Carter Livermore
ATTORNEY AND AGENT

United States Patent Office 3,382,076
Patented May 7, 1968

3,382,076
SUPERSENSITIZATION OF STYRYL DYES IN SILVER HALIDE EMULSIONS
Norman W. Kalenda, Rochester, N.Y., assignor to Eastman Kodak Company, Rochester, N.Y., a corporation of New Jersey
Filed Dec. 8, 1964, Ser. No. 416,754
14 Claims. (Cl. 96—104)

ABSTRACT OF THE DISCLOSURE

Photographic silver halide emulsions sensitized by styryl dyes are advantageously supersensitized by adding at least one sulfonic acid derivative of a bis(triazinylamino)stilbene, a dibenzothiophene dioxide, a biphenyl, a terphenyl, a quaterphenyl, a phenanthrene, a pyrene, or a chrysene.

This invention relates to photographic emulsions containing certain styryl dyes and as supersensitizers therefor, certain sulfonated compounds.

It is known in the art of making photographic emulsions that certain dyes of the cyanine class alter the sensitivity of photographic emulsions of the gelatino-silver kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing certain styryl dyes. Since the conditions in the emulsion, i.e., the hydrogen ion and/or the silver ion concentration undergo little or no change in my method, I shall designate my new method as a kind of supersensitization.

It is, therefore, an object of my invention to provide valuable photographic silver halide emulsions containing at least one styryl dye and as a supersensitizer therefor, certain sulfonated compounds.

Another object is to provide a process for preparing these supersensitized emulsions.

Other objects will become apparent from a consideration of the following description and examples.

The styryl dyes used according to my invention include those described by the following formulas:

(I)
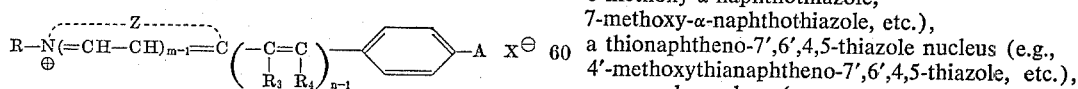

and (II)
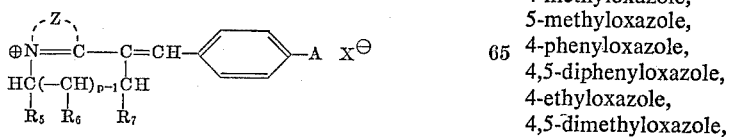

wherein $m$ and $p$ each represent an integer of from 1 to 2; $n$ represents an integer of from 2 to 3; R represents an alkyl group having preferably from 1–8 carbon atoms, e.g., methyl, ethyl, sulfoethyl, carboxyethyl, isopropyl, hydroxypropyl, butyl, sulfobutyl, carboxybutyl, hexyl, octyl, etc.; A represents the hydroxyl radical, an alkoxy group (e.g., methoxy, ethoxy, butoxy, dodecyloxy, etc.) or an

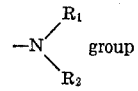 group $R_1$ and $R_2$ each represent (the same or different) group selected from the class consisting of the hydrogen atom, and an alkyl group (e.g., methyl, sulfoethyl, carboxyethyl, hydroxyethyl, methoxyethyl, phenethyl, carboxypropyl, butyl, sulfobutyl, hydroxybutyl, methoxybutyl, hexyl, ethoxyoctyl, sulfodecyl, carboxydecyl, dodecyl, etc.); $R_3$, $R_4$, $R_5$, $R_6$, and $R_7$ each represent the hydrogen atom, and the same or different alkyl group having preferably from 1–4 carbon atoms, e.g., methyl, ethyl, propyl, isopropyl, butyl, etc., or an aryl group, e.g., phenyl, tolyl, etc., each X represents an acid anion, e.g., chloride, bromide, iodide, perchlorate, sulfamate, thiocyanate, p-toluenesulfonate, benzenesulfonate, methyl sulfate, etc., and each Z represents the nonmetallic atoms required to complete a 5- to 6-membered heterocyclic nucleus such as those selected from the class consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
tetrahydrobenzothiazole,
5,6-dimethoxybenzothiazole,
5,6-dioxymethylenebenzothiazole,
5-hydroxybenzothiazole,
6-hydroxybenzothiazole, etc.),
a naphthothiazole nucleus (e.g.,
α-naphthothiazole,
β,β-naphthothiazole,
5-methoxy-β-naphthothiazole,
5-ethoxy-β-naphthothiazole,
8-methoxy-α-naphthothiazole,
7-methoxy-α-naphthothiazole, etc.),
a thionaphtheno-7',6',4,5-thiazole nucleus (e.g.,
4'-methoxythianaphtheno-7',6',4,5-thiazole, etc.),
an oxazole nucleus (e.g.,
4-methyloxazole,
5-methyloxazole,
4-phenyloxazole,
4,5-diphenyloxazole,
4-ethyloxazole,
4,5-dimethyloxazole,
5-phenyloxazole, etc.),
a benzoazole nucleus (e.g.,
benzoxazole,
5-chlorobenzoxazole, 5-methylbenzoxazole,
5-phenylbenzoxazole,
6-methylbenzoxazole,
5,6-dimethylbenzoxazole,
4,6-dimethylbenzoxazole,
5-methoxybenzoxazole,
5-ethoxybenzoxazole,
5-chlorobenzoxazole,
6-methoxybenzoxazole,
5-hydroxybenzoxazole,
6-hydroxybenzoxazole, etc.),
a napthoxazole nucleus (e.g.,
α-naphthoxazole,
β,β-naphthoxazole,
β-naphthocazole, etc.),
a selenazole nucleus (e.g.,
4-methylselenazole,
4-phenylselenazole, etc.),
a benzoselenazole nucleus (e.g.,
benzoselenazole,
5-chlorobenzoselenazole,
5-methoxybenzoselenazole,
5-hydroxybenzoselenazole,
tetrahydrobenzoselenazole, etc.),
a naphthoselenazole nucleus (e.g.,
α-naphthoselenazole,
β,β-naphthoselenazole,
β-naphthoselenazole, etc.),
a thiazoline nucleus (e.g.,
thiazoline,
4-methylthiazoline, etc.),
a 2-pyridine,
a 4-pyridine nucleus, etc.),
a 2-quinoline nucleus (e.g.,
2-quinoline,
3-methyl-2-quinoline,
5-ethyl-2-quinoline,
6-chloro-2-quinoline,
8-chloro-2-quinoline,
6-methoxy-2-quinoline,
8-ethoxy-2-quinoline,
8-hydroxy-2-quinoline, etc.),
a 4-quinoline nucleus (e.g.,
4-quinoline,
6-methoxy-4-quinoline,
7-methyl-4-quinoline,
8-chloro-4-quinoline, etc.),
a 1-isoquinoline nucleus (e.g.,
1-isoquinoline,
3,4-dihydro-1-isoquinoline, etc.),
a 3-isoquinoline nucleus (e.g.,
3-isoquinoline, etc.),
a benz[e]indole nucleus,
a tetrazole nucleus,
an imidazolo[4,5-b]quinoline nucleus,
a 3,3-dialkylindolenine nucleus (e.g.,
3,3-dimethylindolenine,
3,3,5-trimethylindolenine,
3,3,7-trimethylindolenine, etc.),
an imidazole nucleus (e.g.,
imidazole,
1-alkylimidazole,
1-alkyl-4-phenylimidazole,
1-alkyl-4,5-dimethylimidazole, etc.),
a benzimidazole nucleus (e.g.,
benzimidazole,
1-alkylbenzimidazole,
1-aryl-5,6-dichlorobenzimidazole, etc.),
a napthimidazole nucleus (e.g.,
1-alkyl-α-napthimidazole,
1-aryl-β,β-napthimidazole,
1-alkyl-5-methoxy-α-naphthimidazole, etc.), etc.

Styryl dyes of the type defined by Formulas I and II above have been described in one or more of the following representative patents: Durr U.S. Patent 1,845,404, issued Feb. 16, 1932; Winter et al. U.S. Patent 2,164,793, issued July 4, 1939; Carroll et al. U.S. Patent 2,313,922, issued Mar. 16, 1943; Brooker et al. U.S. Patent 2,494,032, issued Jan. 10, 1960; G. de Stevens et al. U.S. Patent 2,892,837, issued June 30, 1959, etc.

The sulfonated derivatives useful in practicing my invention comprise polynuclear aromatic compounds containing at least one sulfo group. The term "polynuclear aromatic" as used herein is intended to mean 2 or more benzene rings fused together (for example, as in naphthalene, pyrene, etc.) or at least 2 benzene rings or aromatic rings directly joined together (for example, as in diphenyl, terphenyl, quaterphenyl, etc.) or through an aliphatic linkage. Such sulfonated derivatives can conveniently be represented by the following general formula:

(III) 

wherein $R^1$ represents a polynuclear aromatic group as defined above and M represents a hydrogen atom or a water-soluble cation salt group (e.g., sodium, potassium, ammonium, triethyl ammonium, triethanolammonium, pyridinium, etc.). These sulfonated derivatives or compounds have been found to have little or no measurable effect by themselves on the sensitivity of photographic silver halide emulsions. Among the most useful of the sulfonated derivatives embraced by Formula III above are the compounds represented by the following general formula:

(IV) 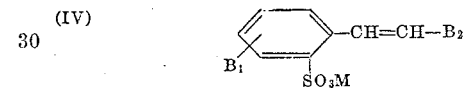

wherein $B_1$ represents a 2-benzothiazolyl group or a 1,3,5-triazin-6-ylamino group, $B_2$ represents an aromatic group (i.e., benzene or substituted benzene) and M has the values given above.

Typical of the sulfonated derivatives of Formula IV above, wherein $B_1$ represents, a 1,3,5-triazin-6-ylamino group are the compounds selected from those represented by the following general formula:

(IVa) 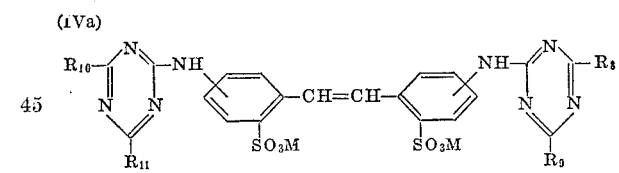

wherein M has the values given above and $R_8$, $R_9$, $R_{10}$, $R_{11}$ each represents a hydrogen atom or a substituent group, such as hydroxyl, aryloxy (e.g., phenoxyl, o-toloxyl, p-sulfophenoxyl, etc.), alkoxyl (e.g., methoxyl, ethoxyl, etc.), a halogen atom (e.g., chlorine, bromine, etc.), a heterocyclic radical (e.g., morpholinyl, piperidyl, etc.), an alkylthio group (e.g., methylthio, ethylthio, etc.), an arylthio group (e.g., phenylthio, tolylthio, etc.), a heterocyclylthio group (e.g., benzothiazylthio, etc.), an amino group, an alkylamino (e.g., methylamino, ethylamino, propylamino, dimethylamino, diethylamino, dodecylamino, cyclohexylamino, β-hydroxyethylamino, di-β-hydroxyethylamino, β-sulfoethylamino, etc.), an arylamino group (e.g., anilino, o-, m-, and p-sulfoanilino, o-, m-, p-chloranilino, o-, m-, and p-anisylamino, o-, m-, and p-toludino, o-, m- and p-carboxyanilino, hydroxyanilino, sulfonaphthylamino, o-, m-, and p-aminoanilino, p-acetamidoanilino, etc.), etc.

Compounds of Formula IVa wherein $R_8$, $R_9$, $R_{10}$, and/or $R_{11}$ each represents a heterocyclylamino group (e.g., 2-benzothiazoleamino, 2-pyridylamino, etc.) can also be used in practicing my invention.

Another group of sulfonated derivatives which are useful in practicing my invention are dibenzothiophene dioxides such as those represented by the following general formula:

(V) 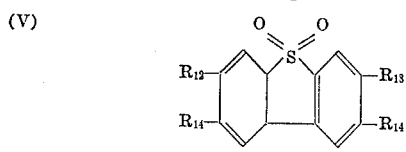

wherein $R_{12}$ is an acylamido group (e.g., acetamido, sulfobenzamido, 4-methoxy-3-sulfobenzamido, 2-ethoxybenzamido, 2,4-diethoxy, benzamido, p-tolylamido, 4-methyl-2-methoxybenzamido, 1-naphthoylamino, 2-naphthoylamino, 2,4-dimethoxybenzamido, 2-phenylbenzamido, 2-thienylbenzamido) or a sulfo group, $R_{13}$ represents a sulfoaryl group (e.g., sulfophenyl, p-sulfodiphenyl, etc.) and $R_{14}$ represents a hydrogen atom or a sulfo group, said compound containing at least one sulfo group.

Still other useful sulfonated derivatives of Formula III above include compounds containing diphenyl, terphenyl, quaterphenyl, phenanthrene, pyrene, chrysene, etc., nuclei. Many of the above defined sulfonated compounds are shown in Jones U.S. Patent 2,961,318, issued Nov. 22, 1960.

Included among the styryl dyes of Formulas I and II above are the following typical examples.

Dye No.:     Dye name
I _____ 2-p-diethylaminostyryl-3-ethyl-6-(2-oxo-1-pyrrolidinyl)benzothiazolium p-toluenesulfonate.
II _____ 2-p-dimethylaminostyryl-3-ethyl-6-(2-oxo-1-pyrrolidinyl)benzothiazolium p-toluenesulfonate.
III _____ 2-p-dimethylaminostyryl-3-methyl-benzothiazolium iodide.
IV _____ 2-p-dimethylaminostyryl-3-ethyl-benzothiazolium iodide.
V _____ 3-ethyl-2-p-dimethylamino-α-ethylstyrylbenzothiazolium iodide.
VI _____ 3-ethyl-2-p-dimethylamino-β-methylstyrylbenzothiazolium iodide.
VII ____ 2-p-dimethylaminostyryl-3-ethyl-benzoselenazolium iodide.
VIII ___ 2-p-dimethylaminostyryl-3-ethyl-benzoxazolium iodide.
IX _____ 2-p-dimethylaminostyryl-1-methyl-quinolinium iodide.
X _____ 4-p-dibutylaminostyryl-1-methyl-quinolinium iodide.
XI _____ 4-p-dimethylaminostyryl-1-methyl-quinolinium iodide.
XII ____ 2-p-dimethylaminostyryl-3-ethyl-1,1-dimethyl-1H-benz[e]indolium iodide.
XIII ___ 2-p-dimethylaminostyryl-3-ethyl-β-naphthothiazolium iodide.
XIV ___ 2-(4-p-dimethylaminophenyl-1,3-butadienyl)-3-ethylbenzoxazolium iodide.
XV ____ 3-carboxyethyl-2-p-dimethylaminostyryl-1,1-dimethyl-1H-benz[e]indolium iodide.
XVI ___ 2-(4-p-dimethylaminophenyl-1,3-butadienyl)-3-ethylbenzothiazolium iodide.
XVII __ 3-carboxyethyl-2-(4-p-dimethylaminophenyl-1,3-butadienyl)-1,1-dimethyl-1H-benz[e]indolium iodide.
XVIII _ 1-o-chlorophenyl-5-p-dimethylaminostyryl-4-ethyltetrazolium iodide.
XIX ___ 2-p-dimethylaminostyryl-1,3-diethyl-1H-imidazolo[4,5-b]-quinolinium iodide.
XX ____ 5,6-dichloro-2-p-dimethylaminostyryl-1,3-diethylbenzimidazolium iodide.
XXI ___ 2-p-dimethylaminostyryl-1-methylpyridinium iodide.
XXII __ 4-p-dimethylaminostyryl-1-ethylpyridinium iodide.
XXIII _ 2-p-dimethylaminostyryl-3-ethylnaphtho[2,3-d]thiazolium iodide.
XXIV _ 4-p-dimethylaminobenzylidene-1,2,3,4-tetrahydropyrido[2,1-b]benzothiazolium salt.
XXV __ 3-p-dimethylaminobenzylidene-2,3-dihydro-1H-pyrrolo[2,1-b]benzothiazolium salt.

Included among the sulfonated derivatives or compounds of Formula III above are the following typical examples.

Compound:     Name
A ____ Calcofluor White-MR. This is the trade name for a bis(s-triazin-2-ylamino)stilbene-2,2'-disulfonic acid, sodium salt.
B ____ 3,7-bis(4-methoxy-3-sulfobenzamido)-dibenzothiophene dioxide, sodium salt.
C ____ 4,4''-bis(2,4-dimethoxy-5-sulfobenzamido)-p-terphenyl, triethanolamine salt.
D ____ Leucophor B. This is the trade name for a bis(s-triazin-2-ylamino)stilbene-2,2'-disulfonic acid, sodium salt.
E ____ Sodium 3,7-diacetamido-2,8-disulfodibenzothiophene dioxide.
F ____ Sodium 6-(4-methoxy-3-sulfo-ω-phenylacryloyl)pyrene.
G ____ Sodium 4,4'-bis[2-phenoxy-4-(2-hydroxyethylamino)-1,3,5-triazin-6-ylamino]-stilbene-2,2'-disulfonate.
H ____ 4',4''-disulfo-p-terphenyl, disodium salt.
J ____ Chrysene sodium sulfonate.
K ____ Disodium pyrene-3,X-disulfonate.
L ____ Sodium 4,4'-bis[2-(4-sulfoanilino)-4-(2-hydroxyethylamino)-1,3,5-triazine-6-ylamino]-stilbene-2,2'-disulfonate.
M ____ Sodium phenanthrene-3-sulfonate.
N ____ 4',4''-bis(4-sulfophenoxyacetamido)-p-terphenyl, triethanolamine salt.

According to my invention, I incorporate one or more of the styryl dyes represented by Formulas I and II above with one or more of the sulfonated derivatives represented by Formula III above. My invention is particularly directed to the ordinarily employed gelatino-silver halide emulsions, e.g., gelatino-silver chloride, -chlorobromide, or -bromide, etc., developing-out emulsions. However, the supersensitizing combinations can be employed in silver halide emulsions in which the carrier is other than gelatin, e.g., albumin, agar-agar, etc., or a hydrophilic resinous material such as polyvinyl alcohol, partially hydrolyzed polyvinyl acetate, poly N-vinylpyrrolidone, etc., which has no deleterious effect on the light-sensitive silver halide.

The optimum concentration of an individual sensitizing dye can be determined in a manner well known to those skilled in this art by measuring the sensitivity of a series of test portions of the same emulsion, each portion containing a different concentration of the sensitizing dye. The optimum concentration of one supersensitizing combination can, of course, be readily determined in the same manner, by measuring the sensitivity of a series of test portions of the same emulsion, each portion containing different concentrations of the components in the combination. In determining the optimum concentration for the supersensitizing combination, it is advantageous to employ, at first, concentrations of the styryl dye less than its optimum concentration. The concentrations of the dye can then be increased until the optimum concentration of the supersensitizing combination is determined.

The methods of incorporating sensitizing dyes in silver halide emulsions are well known to those skilled in the art and these known techniques are employed in dispersing the styryl dyes, and the sulfonated derivatives, of my invention in the emulsions. These components can be directly dispersed in the emulsions, or they can first be dissolved in some convenient solvent, such as pyridine, methyl alcohol, acetone, water, etc. (or mixtures of such solvents), or diluted with water in some instances, and added to the emulsions in the form of these solutions. If desired, they can be separately dissolved in a given solvent and added separately to the emulsion, or they can be dissolved in the same or different solvent and these solutions mixed together before addition is made to the silver halide emulsions. The styryl dyes, and the sulfonated derivatives, can be dispersed in the finished emulsions and should be uniformly distributed throughout the emulsions before the emulsions are coated on a suitable support, such as paper, glass, cellulose ester film, polyvinyl resin film (e.g., polyvinyl chloride film, etc.), polyester film, etc. The following procedure has been found quite satisfactory. Stock solutions of the styryl dyes, and the sulfonated derivatives, are prepared by separately dissolving these in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the sulfonated derivative is slowly added to the emulsion while stirring. Stirring is continued until thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The aforegoing procedure and proportions are to be regarded only as illustrative. Clearly, my invention is directed to any silver halide emulsion containing a combination of the aforesaid styryl dyes, and sulfonated derivatives of Formula III above, whereby a supersensitizing effect is obtained.

The following examples will serve to illustrate further the manner of practicing my invention.

To different portions of the same batch of photographic gelatino-silver-bromiodide emulsion were added (1) a styryl dye, (2) a sulfonated derivative of Formula III above, and (3) a combination of (1) and (2). The emulsions were held for a short time at about 50–52° C., coated on a transparent support, chill set and dried. The coatings were then exposed to a tungsten light source in an Eastman sensitometer (Type 1B) through a Wratten #16 filter which transmits substantially no light of wavelength shorter than about 520 m$\mu$. The filter was selected to correspond to the sensitizing region of the styryl dyes illustrated. The exposed coatings were then processed for three minutes in a developer having the following composition:

| | G. |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |

Water to make 1 liter.

fixed in a conventional sodium thiosulfate fixing bath, washed and dried. The speed, gamma and fog for each of the coatings was then measured.

The invention is still further illustrated by the following specific examples.

Example 1

A silver bromoiodide emulsion was made of the type described by Trevelli and Smith, Phot. Journal, vol. 79, 330 (1939). The melted emulsion was divided into separate portions to which were added a solution of the sensitizers I to XVII, XXIV, and XXV, and combinations of these with sulfonated compounds A to H and J to N as indicated in Table 1. Each portion was digested at 50° C. for 10 minutes and then coated on a cellulose acetate film support and dried. The dried samples were then given identical exposure, in an Eastman sensitometer (Type 1B) through a Wratten #16 filter for 1 second to a tungsten light source, processed for 3 minutes in the aforementioned developer, fixed, washed and dried. Densitometric measurements were made of the developed images on each coating. The relative speed values were calculated based on an arbitrary relative speed of 100 for the coating sensitized with .08 g. of Dye I per mole of silver halide and the gamma values determined. These values together with the fog values are given in Table 1.

TABLE 1

| Dye and Concentration, g./mol. Silver Halide | Relative Speed | Gamma | Fog |
|---|---|---|---|
| I (.08) | 100 | 1.41 | .06 |
| I (.08) plus A (1.15) | 1,170 | 1.52 | .09 |
| II (.08) | 331 | 1.44 | .07 |
| II (.08) plus A (1.15) | 1,159 | 1.40 | .08 |
| III (.08) | 69 | 1.06 | .08 |
| III (.08) plus A (1.15) | 490 | 1.32 | .08 |
| XXIV (.08) | 30 | 1.77 | .07 |
| XXIV (.08) plus A (1.15) | 955 | 1.70 | .07 |
| XXV (.08) | 17.5 | 1.98 | .11 |
| XXV (.08) plus A (1.15) | 417 | 1.64 | .06 |
| IV (.08) | 132 | 1.00 | .04 |
| IV (.08) plus A (1.1) | 224 | 1.12 | .04 |
| IV (.08) plus B (1.1) | 276 | 1.08 | .03 |
| IV (.08) plus C (0.56) | 468 | 1.27 | .03 |
| IV (.08) plus D (2.2) | 363 | 1.10 | .03 |
| V (.08) | 17.5 | 1.43 | .03 |
| V (.08) plus A (1.1) | 309 | 1.00 | .04 |
| VI (.08) | 55 | 1.14 | .04 |
| VI (.08) plus A (1.1) | 263 | 1.05 | .05 |
| VII (.08) | 550 | 0.96 | .04 |
| VII (.08) plus A (1.15) | 851 | 0.98 | .04 |
| VIII (.08) | 48 | 1.28 | .04 |
| VIII (.08) plus A (1.15) | 331 | 1.05 | .03 |
| IX (.08) | 35 | 1.02 | .03 |
| IX (.08) plus A (1.15) | 105 | 0.85 | .05 |
| X (.04) | 18 | 1.10 | .04 |
| X (.04) plus A (1.15) | 725 | 1.10 | .05 |
| XI (.04) | 43 | 1.01 | .03 |
| XI (.04) plus A (1.15) | 468 | 1.16 | .04 |
| XII (.08) plus A (1.15) | 209 | 0.96 | .05 |
| XIII (.08) | 186 | 1.22 | .04 |
| XIII (.08) plus A (1.15) | 776 | 0.96 | .04 |
| XIV (.04) | 42 | 1.35 | .03 |
| XIV (.04) plus A (1.15) | 575 | 0.93 | .04 |
| XV (.08) | 68 | 1.10 | .04 |
| XV (.08) plus A (1.15) | 200 | 1.04 | .04 |
| XVI (.04) | 46 | 1.06 | .04 |
| XVI (.04) plus A (1.15) | 289 | 0.92 | .04 |
| XVII (.02) | (¹) | | .03 |
| XVII (.02) plus A (1.15) | 55 | 1.22 | .03 |
| XII (.08) | 58 | 1.02 | .03 |
| X (.04) | 13.8 | 1.12 | .05 |
| X (.04) plus E (1.1) | 59 | 1.15 | .04 |
| X (.04) plus H (2.2) | 23 | 1.22 | .04 |
| X (.04) plus J (1.1) | 105 | 1.32 | .05 |
| X (.04) plus K (1.1) | 30 | 1.26 | .05 |
| X (.04) plus G (1.1) | 53 | 1.25 | .04 |
| X (.04) plus L (1.1) | 24.5 | 1.14 | .04 |
| X (.04) plus M (2.2) | 19 | 1.18 | .04 |
| X (.04) plus N (0.56) | 31 | 1.15 | .04 |
| X (.04) plus F (0.56) | 246 | 1.15 | .06 |

¹ No. Sens.

It will be noted from the above table that in every case of comparison, the relative speed of the combination of dye and the sulfonated compound was substantially higher, and in many cases by a factor of several or more times, than that of the individual dye. For example, the combination of Dye I and sulfonated compound A produces a relative speed of 1170 which value is approximately 12 times that of Dye I alone.

Example 2

Coatings were made as in Example 1, excepting that Dyes XVIII to XXIII and combinations of these with sulfonated compound A, were employed. These coatings were exposed on an Eastman sensitometer (Type 1B) through a Wratten #16 filter, processed and the density values determined. The relative speed (based on 100 for Dye XVIII), gamma and fog values are set forth in Table 2 below.

TABLE 2

| Dye and Concentration, g./mol. Silver Halide | Relative Speed | Gamma | Fog |
|---|---|---|---|
| XVIII (.08) | 100 | 1.50 | .04 |
| XVIII (.08) plus A (1.0) | 363 | 1.18 | .04 |
| XIX (.08) | 132 | 1.53 | .04 |
| XIX (.08) plus A (1.0) | 1,260 | 1.10 | .06 |
| XX (.08) | 34 | 1.47 | .05 |
| XX (.08) plus A (1.0) | 105 | 0.97 | .04 |
| XXI (.08) | 302 | 1.41 | .06 |
| XXI (.08) plus A (1.0) | 692 | 1.04 | .05 |
| XXII (.08) | 832 | 1.58 | .05 |
| XXII (.08) plus A (1.0) | 1,180 | 1.18 | .05 |
| XXIII (.08) | 155 | 1.24 | .04 |
| XXIII (.08) plus A (1.0) | 417 | 1.26 | .06 |

Referring to above Table 2, it will be seen that in each case of comparison the relative speed of the combination of the specified dye and sulfonated compound A is substantially higher than that of the individual dye.

The accompanying drawing illustrates the supersensitizing effect obtained with three of my new combinations in gelatino-silver-bromoiodide emulsion. Each figure of the drawing is a diagrammatic reproduction of two spectrograms. In each figure, the sensitivity of the emulsion containing the styryl dye of Formulas I or II is represented by the solid lower curve. The upper curve (dotted line) represents the sensitivity conferred on the emulsion by the combination of the styryl dye with one of the sulfonated compounds of my invention. No curve illustrating the effect of the sulfonated compound alone is shown, inasmuch as it has been found that these sulfonated compounds have little or no measurable effect on the sensitivity of the emulsions.

In FIGURE 1, curve A represents the sensitivity of an ordinary gelatino-silver-bromoiodide emulsion sensitized with 4-p-dibutylaminostyryl-1-methylquinolinium iodide (Dye X), while curve B represents the sensitivity of the same emulsion sensitized with a combination of above Dye X and Calcofluor White MR, a bis (s-triazin-2-ylamino)stilbene-2, 2'-disulfonic acid, sodium salt. The sensitometric measurements for these emulsions are given in above Table 1.

In FIGURE 2, curve C represents the sensitivity of an ordinary gelatino-silver-bromoiodide emulsion sensitized with 4-p-dimethylaminostyryl-1-methylquinolinium iodide (Dye XI), while curve D represents the sensitivity of the same emulsion sensitized with a combination of above Dye XI and Calcofluor White MR, a bis (s-triazin-2-ylamino) stilbene-2, 2'-disulfonic acid, sodium salt. The sensitometric measurements for these emulsions are given in above Table 1.

In FIGURE 3, curve E represents the sensitivity of an ordinary gelatino-silver-bromoiodide emulsion sensitized with 4-p-dibutylaminostyryl-1-methylquinolinium iodide (Dye X) while curve F represents the sensitivity of the same emulsion sensitized with a combination of above Dye X and sodium 6-(4-methoxy-3-sulfo-$\omega$-phenylacryloyl)-pyrene. The sensitometric measurements for these emulsions are given in above Table 1.

The term "sulfo" is used in the foregoing and in the following claims to mean both the free acid group, as well as salts of this free acid group, including alkali metal salts (e.g., sodium, potassium, etc.), ammonium salts, amine addition salts (e.g., triethylamine, ethanolamine, triethanolamine, pyridine, picoline, etc.). By thus using these water-soluble salt derivatives, they can be added to the emulsions in substantially neutral aqueous solutions without disturbing the pH of the emulsions. However, when using small quantities of the sulfonated derivatives, the free acids can also be used to advantage.

This invention has been described in detail with particular reference to preferred embodiments thereof, but it will be understood that variations and modifications can be effected within the spirit and scope of the invention as described herein above and as defined in the appended claims.

I claim:
1. A photographic silver halide emulsion containing (1) at least one styryl dye represented by the formulas:

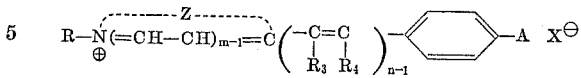

and

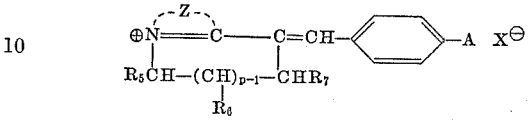

wherein $m$ and $p$ each represents an integer of from 1 to 2; $n$ represents an integer of from 2 to 3; R represents an alkyl group; A represents a group selected from the class consisting of the hydroxyl group, an alkoxy group and a

$R_1$ and $R_2$ each represents a group selected from the class consisting of the hydrogen atom and an alkyl group; $R_3$, $R_4$, $R_5$, $R_6$, and $R_7$ each represents a member selected from the group consisting of the hydrogen atom, an alkyl group and an aryl group; X represents an acid anion; and Z represents the nonmetallic atoms required to complete a 5- to 6-membered heterocyclic nucleus, and (2) at least one sulfonic acid derivative of a compound selected from the class consisting of a bis(triazinylamino) stilbene, a dibenzothiophene dioxide, a biphenyl, a terphenyl, a quaterphenyl, a phenanthrene, a pyrene, and a chrysene.

2. A photographic silver halide emulsion containing (1) at least one styryl dye represented by the general formulas:

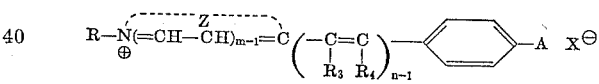

and

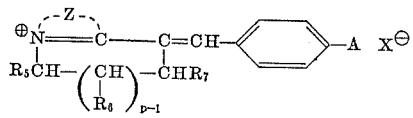

wherein $m$ and $p$ each represents an integer of from 1 to 2; $n$ represents an integer of from 2 to 3; R represents an alkyl group; A represents a group selected from the class consisting of the hydroxyl group, an alkoxy group and a

$R_1$ and $R_2$ each represents a group selected from the class consisting of the hydrogen atom and an alkyl group; $R_3$, $R_4$, $R_5$, $R_6$, and $R_7$ each represents a member selected from the group consisting of the hydrogen atom, an alkyl group and an aryl group; X represents an acid anion; and Z represents the nonmetallic atoms required to complete a 5- to 6-membered heterocyclic nucleus selected from the class consisting of a thiazole nucleus, a benzothiazole nucleus, a naphthothiazole nucleus, a thianaphtheno-7',6', 4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1-isoquinoline nucleus, a 3-isoquinoline nucleus, a benz[e]indole nucleus, a tetrazole nucleus, an imidazolo [4,5-b]quinoline nucleus, a 3,3-dialkylindolenine nucleus, an imidazole nucleus, a benzimidazole nucleus, and a naphthimidazole nucleus, and (2) at least one sulfonic acid derivative of a compound selected from the class consisting of a bis(triazinylamino)stilbene, a dibenzothiophene dioxide, a biphenyl, a terphenyl, a quaterphenyl, a phenanthrene, a pyrene, and a chrysene.

3. A photographic silver halide emulsion of claim 2 wherein said (2) is a sulfonic acid derivative of a bis(triazinylamino)stilbene.

4. A photographic silver halide emulsion of claim 2 wherein said (2) is a sulfonic acid derivative of a dibenzothiophene dioxide.

5. A photographic silver halide emulsion of claim 2 wherein said (2) is a sulfonic acid derivative of a terphenyl.

6. A photographic silver halide emulsion of claim 2 wherein said (2) is a sulfonic acid derivative of a pyrene.

7. A photographic silver halide emulsion of claim 2 wherein said (2) is a sulfonic acid derivative of a chrysene.

8. A photographic silver halide emulsion containing a supersensitizing combination of 4-p-dibutylaminostyryl-1-methylquinoline iodide with Calcofluor White.

9. A photographic silver halide emulsion containing a supersensitizing combination of 4-p-dimethylaminobenzylidene - 1,2,3,4-tetrahydropyrido[2,1-b]benzothiazolium salt with chrysene sodium sulfate.

10. A photographic silver halide emulsion containing a supersensitizing combination of 4-p-dibutylaminostyryl-1-methyl-quinoline iodide with sodium 6-(4-methoxy-3-sulfo-ω-phenylacryloyl)-pyrene.

11. A photographic silver halide emulsion containing a supersensitizing combination of 2-p-dimethylaminostyryl-1,3-diethyl-1H-imidazolo[4,5-b]quinolinium iodide with Calcofluor White.

12. A photographic silver halide emulsion containing a supersensitizing combination of 2-(4-p-dimethylaminophenyl-1,3-butadienyl)-3-ethylbenzoxazolium iodide with Calcofluor White.

13. A photographic element comprising a support coated with at least one layer containing a photographic silver halide emulsion of claim 1.

14. A photographic element comprising a support coated with at least one layer containing a photographic silver halide emulsion of claim 2.

References Cited

UNITED STATES PATENTS

| | | | |
|---|---|---|---|
| 2,875,058 | 2/1959 | Carroll et al. | 96—104 |
| 2,933,390 | 4/1960 | McFall et al. | 96—104 |
| 2,947,630 | 8/1960 | Jones | 96—104 |
| 2,950,196 | 8/1960 | Carroll et al. | 96—104 |
| 2,961,318 | 11/1960 | Jones | 96—104 |

J. TRAVIS BROWN, *Primary Examiner.*